United States Patent [19]

Drori

[11] 4,084,749
[45] Apr. 18, 1978

[54] FLOW REDUCING DEVICES PARTICULARLY USEFUL AS DRIP EMITTERS FOR DRIP IRRIGATION

[76] Inventor: Mordeki Drori, 89 Zahal Street, Kiron, Israel

[21] Appl. No.: 715,545

[22] Filed: Aug. 18, 1976

[30] Foreign Application Priority Data

Apr. 11, 1976 Israel .......................................... 49388
May 20, 1976 Israel .......................................... 49616

[51] Int. Cl.² .......................... A01G 25/16; B05B 1/30
[52] U.S. Cl. ................................. 239/271; 137/505.13;
137/517; 138/42; 239/542; 239/547; 239/571
[58] Field of Search ................ 239/76, 262, 267, 268, 239/271, 272, 542, 547, 570–572; 138/37, 40–46; 251/127; 137/505.13, 517, DIG. 4, 484.4, 497, 498, 509, 511, 514, 535, 540, 542; 285/DIG. 22

[56] References Cited

U.S. PATENT DOCUMENTS

| | | | |
|---|---|---|---|
| 2,760,824 | 8/1956 | Leadbetter | 239/547 X |
| 3,791,587 | 2/1974 | Drori | 239/542 X |
| 3,882,892 | 5/1975 | Menzel | 239/542 X |
| 3,924,881 | 12/1975 | O'Connor | 285/DIG. 22 X |
| 4,011,893 | 3/1977 | Bentley | 239/542 X |

FOREIGN PATENT DOCUMENTS

| | | | |
|---|---|---|---|
| 207,725 | 5/1957 | Australia | 239/572 |
| 520,774 | 7/1953 | Belgium | 137/DIG. 4 |
| 904,791 | 11/1945 | France | 137/517 |
| 2,535,732 | 2/1976 | Germany | 239/542 |

Primary Examiner—Evon C. Blunk
Assistant Examiner—Andres Kashnikow
Attorney, Agent, or Firm—Benjamin J. Barish

[57] ABSTRACT

Flow-reducing devices particularly useful as drip emitters comprise a housing having a closure cap snap-fitted thereto and enclosing a flow-retarding member formed with a plurality of recesses on opposite faces each recess bridged by a pair of holes to provide a serial path for the flow of the water through the holes from one face to the opposite face. Also described is the use of a regulator including a valve member sensing the fluid pressure at the inlet of the device to produce a substantially uniform output of water despite variations in the line pressure at the inlet.

7 Claims, 7 Drawing Figures

U.S. Patent    April 18, 1978    Sheet 1 of 2    4,084,749
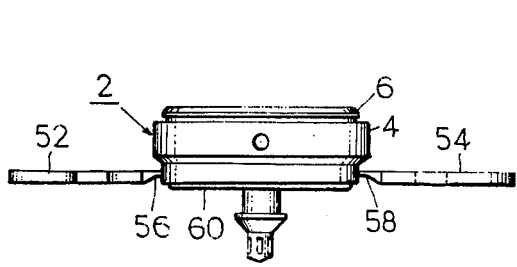
FIG.1
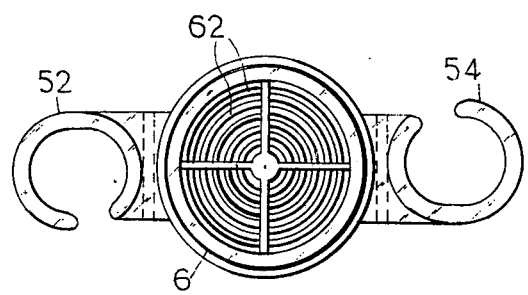
FIG.2
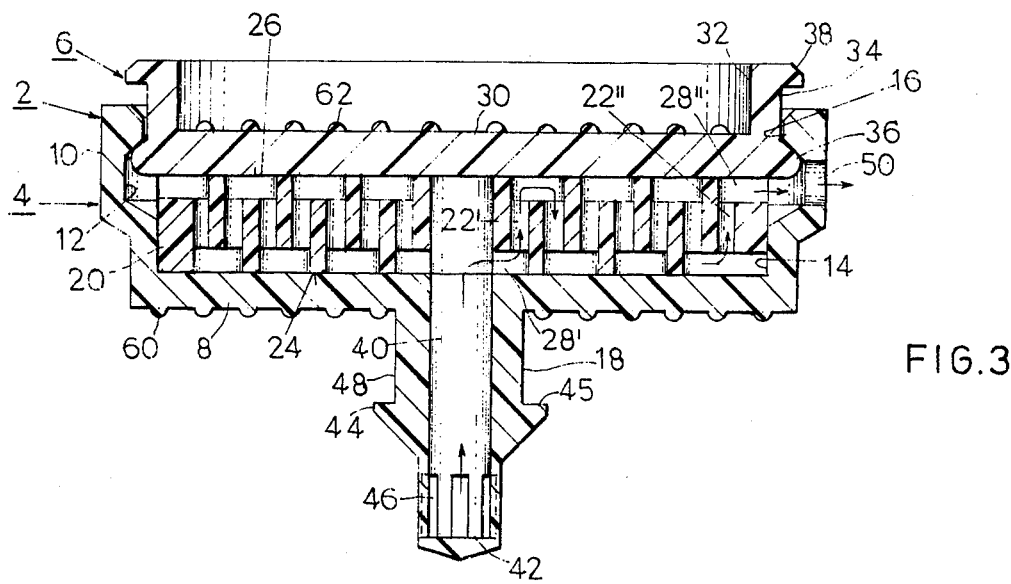
FIG.3
FIG.4a
FIG.4b
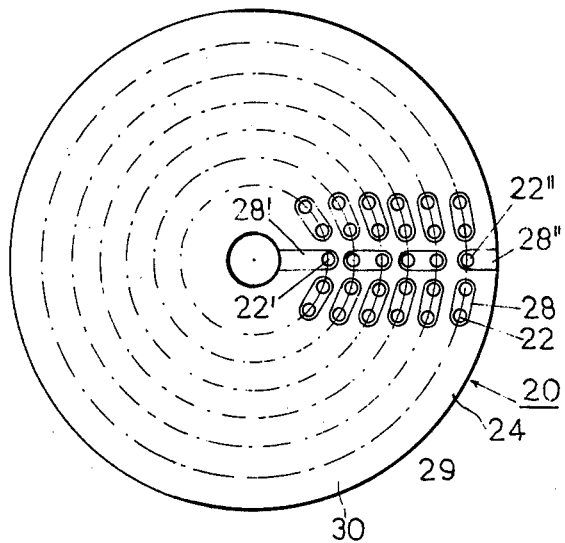

FLOW REDUCING DEVICES PARTICULARLY USEFUL AS DRIP EMITTERS FOR DRIP IRRIGATION

BACKGROUND OF THE INVENTION

The present invention relates to flow-reducing devices, and particularly to drip emitters useful for trickle or drip irrigation.

Trickle or drip irrigation is increasingly gaining wide-spread use as a means for supplying water, and sometimes fertilizer and other soil additives, to field crops and orchards. In some known devices, the dribble or trickle flow of the water is effected by small openings, but these devices have the disadvantage that they easily clog. In other devices, a long-circuitous path, sometimes called a labyrinth or maze, is provided for the water so that it eventually discharges in the form of a slow trickle. The known devices of this type, however, are generally large and expensive, and/or are difficult to clean and maintain because of the long circuitous path that must be provided.

My prior U.S. Pat. No. 3,791,587 describes a new form of flow-reducing device having advantages in the above respects.

In addition, drip emitters disposed along a water supply line usually produce non-uniform outputs because of pressure drops along the length of the line, fluctuations in the line pressure, and/or different elevations at which the emitters are located. This is highly undesirable, and a number of arrangements have been proposed to correct it, but the known arrangements have not proved entirely satisfactory from the cost and operational standpoint.

SUMMARY OF THE INVENTION

An object of the present invention is to provide a flow-reducing device of the long-circuitous path type having further advantages in the above respects, particularly with respect to its suitability for mass-production and assembly at low cost.

Another object of the invention is to provide a flow-regulating arrangement particularly, but not exclusively, useful in the above-mentioned flow-reducing device in order to maintain a substantially uniform output notwithstanding variations in the inlet pressure of each device.

According to one aspect of the present invention, there is provided a flow-reducing device particularly useful for trickle or drip irrigation, comprising a housing including a disc-shaped end wall and a peripheral annular wall formed with an annular recess on its inner face to define an inner annular shoulder adjacent to the end wall, and an outer annular shoulder. The housing further includes an inlet opening formed centrally through the end wall, and an outlet opening formed through the annular recess of the peripheral wall. The housing is closed by a disc-shaped closure cap formed with an annular recess on its outer face to define an inner annular shoulder and an outer annular shoulder. A disc-shaped flow-retarding member is disposed within the housing and has an inlet opening aligned with the central inlet opening of the housing, an outlet opening aligned with the annular recess in the housing peripheral wall, and a circuitous fluid flow pathway between its inlet and outlet openings for retarding the flow of the fluid therethrough. The closure cap is snapfitted into the main housing section with the inner annular shoulder of the cap underlying the outer annular shoulder of the main housing section, and with the inner face of the cap applying a compressive force against the flow-retarding member to hold same in position with its outlet opening aligned with the annular recess in the housing peripheral wall. The recess thus serves as an outlet path for the flow of the fluid to the housing outlet opening.

According to a preferred embodiment of the invention described below, the housing includes a central stem for insertion into a fluid carrying pipe, the stem having an axial bore constituting the inlet opening.

According to another aspect of the invention, the flow-reducing device as described above includes a regulator comprising a rod passing through the bore in the central stem and into the housing of the disc-shaped flow-retarding member. The bore of the stem is formed with an internal annular shoulder, and a valve member is carried at one end of the rod adjacent to the annular shoulder. A spring-biassed pressure-sensing member, having a larger cross-sectional area than the valve member, is carried at the opposite end of the rod and is disposed within the housing such as to sense the fluid pressure at the inlet to the housing and to move, in response thereto, the rod and valve member with respect to the internal annular shoulder in the stem.

The invention also provides a regulator as described above useful for other applications.

BRIEF DESCRIPTION OF THE DRAWINGS

The invention is herein described, for purposes of example only, with respect to the accompanying drawings, wherein:

FIG. 1 is a longitudinal sectional view of one form of flow-reducing device or drip emitter, of the general type of my U.S. Pat. No. 3,791,587, but constructed in accordance with the present invention;

FIG. 2 is a top plan view of the device of FIG. 1;

FIG. 3 is an enlarged fragmentary sectional view corresponding to that of FIG. 1 of the main elements of the device;

FIGS. 4a and 4b are plan views illustrating the two faces of the flow-retarding member included within the device;

Figure 5:
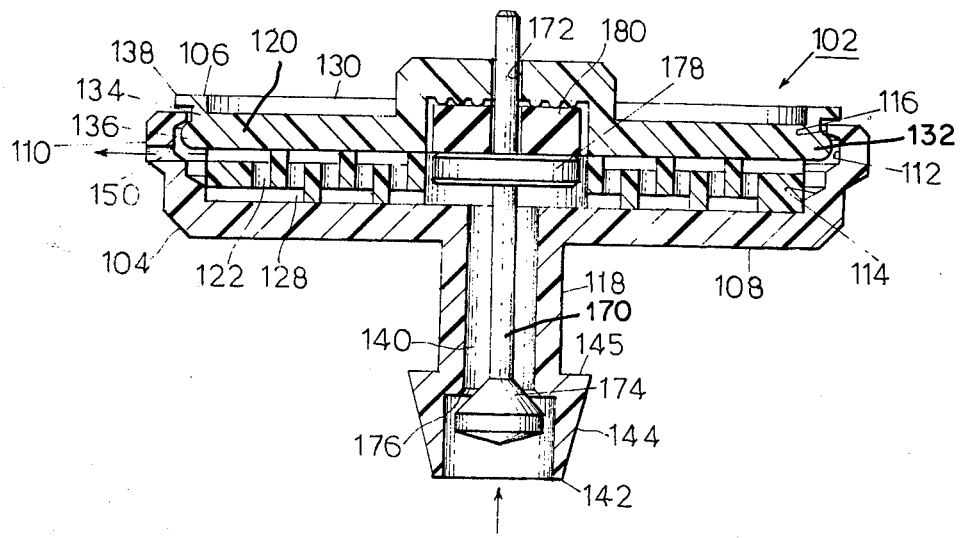
FIG. 5 is a transverse sectional view of the flow-reducing device of FIGS. 1 – 4b, equipped with a regulator.

The drip irrigation device illustrated in the drawings, and therein generally designated 2, comprises a housing 4 and a closure cap 6 releasably attached thereto by a snap-fit. As particularly shown in FIG. 3, housing 4 includes a disc-shaped end wall 8 and a peripheral wall 10 formed with an annular recess 12 on its inner face to define an inner annular shoulder 14 adjacent to end wall 8, and an outer annular shoulder 16. End wall 8 is formed with a central stem 18 for insertion into a fluid-carrying pipe (not shown).

A disc-shaped, resilient, flow-retarding member 20 is disposed within the housing 4 between its end wall 8 and the closure cap 6. Member 20 is formed with a large number of holes 22 extending therethrough from one face 24 (FIG. 4a) to the opposite face 26 (FIG. 4b). Each face is also formed with a plurality of channels or recesses 28 each bridging a pair of holes 22. The recesses on one face (e.g. 24) overlap those on the other face (e.g. 26) such that the pair of holes bridged by a recess on one face lead to separate recesses on the opposite face, to provide a serial path for the flow of the water through the holes, as described in my U.S. Pat. No. 3,791,587.

Closure cap 6 also includes a disc-shaped wall 30 surrounded by a peripheral wall 32 formed with an annular recess 34 on its outer face to define an inner annular shoulder 36 and an outer annular shoulder 38. The device is assembled by disposing the flow-retarding member 20 into housing 4 and then snap-fitting closure cap 6 thereover by pressing the cap until its inner annular shoulder 36 snaps behind to underlie the outer annular shoulder 16 of housing 4, as illustrated, in FIG. 3.

Stem 18, extending centrally of the housing end wall 8, is formed with an axial bore 40 closed at its tip 42 by a pointed end wall. An annular, tapered flange or shoulder 44 having a flat rear face 45 is formed on stem 18 intermediate its tip 42 and wall 8 of the housing. A plurality of radial openings 46 are formed through the stem side wall between its shoulder 44 and tip 42.

Bore 40 constitutes an inlet opening for conducting the water from the water supply pipe (not shown) into housing 4, the housing being formed with an outlet opening 50 extending through the annular recess 12 of its peripheral wall 10. The flow-retarding member 20 includes an inlet recess 28' at its center leading to an inlet hole 22', and with an outlet hole 22" at its outer periphery communicating with an outlet recess 28" formed on each of its two faces, as shown particularly in FIGS. 4a and 4b. When closure cap 6 is snapped into housing 4, end wall 30 of the cap presses against the outer face of the flow-retarding member 20 to hold same in position between it and housing end wall 8, with the outlet recess 28" on the face of the member contacted by the cap being aligned with annular recess 12 formed in the peripheral wall 10 of the housing.

Housing 4 is further formed with a flexible hook extension 52, 54 joined to each side of wall 8 by a reduced-thickness juncture 56, 58, to permit the extensions to be flexed so as to be hooked around the water supply pipe to which the device is mounted. In addition, the lower surface of end wall 8, and the upper surface of the closure cap 6, are preferably formed with external ribs 60 and 62, respectively, for strengthening purposes.

In use, stem 18 is inserted through an opening formed in the water supply pipe (not shown) so that the wall of the pipe is gripped between wall 8 of the housing and shoulder 44 of the stem. Extensions 52, 54 are then hooked around the pipe to securely hold the device in place. Openings 46 through the side wall at the tip of stem 18 provide a filtering passageway for the flow of the water into bore 40 of the stem. The water then flows into inlet recess 28' and inlet hole 22' of the flow-retarding member 20; then serially through all the holes 22 and recesses 28, the water passing back and forth from one face to the other face of the member; and finally it exits in a slow trickle through the outlet hole 22", an outlet recess 28", and housing outlet 50.

It will thus be seen that the flow-retarding member 20, and the faces of the walls 8, 30 in contact therewith, force the water to flow through a very long circuitous path back and forth from one face of the member to the other until it exits through outlet opening 22". This flow path has many sharp turns, and its cross-sectional area frequently and abruptly changes, relatively small cross-sectional areas (the holes 22) alternating with relatively large cross-sectional areas (the recesses 28). This produces frequent and abrupt changes in the velocity of the flowing water, and also discontinuities in the wall bounding the flow path. All these factors increase the friction, eddying, swirling and turbulence of the water as it moves through this path such that a very reduced flow or trickle is produced at the outlet end.

Recess 12 facilitates the snap-attachment of the closure cap, and also provides an outlet path or channel for the flow of the water from outlet recess 28" to the housing outlet 50. Since an outlet recess 28" is formed on both of the faces of member 20, this member may be simply inserted within the housing on either side, and the closure cap 6 may then be snap-attached to the housing to press the member between it and the housing wall 8.

The illustrated device thus requires but three simple parts (namely housing 4, cap 6 and flow-retarding member 20) all of which may be made of plastic and produced in volume and at low cost. Moreover, the device may be quickly assembled by merely inserting member 20, with either side facing upwardly, into housing 4, and then snap-attaching closure cap to the housing.

FIG. 5 illustrates another such device, generally designated 102, similarly comprising a housing 104, and a closure cap 106 releasably attached thereto by a snap-fit. Housing 104 includes a disc-shaped end wall 108 and a peripheral wall 110 formed with an annular recess 112 on its inner face to define an inner annular shoulder 114 adjacent to end wall 108, and an outer annular shoulder 116. End wall 108 is formed with a central stem 118 for insertion into a fluid-carrying pipe (not shown).

A disc-shaped, resilient, flow-retarding member 120, similar to member 20 in FIGS. 1 – 4b, is disposed within housing 104 between its end wall 108 and closure cap 106. Member 120 is formed with a large number of holes 122 extending therethrough from one face to the opposite face, each face being formed with a plurality of channels or recesses 128 each bridging a pair of holes 122. The recesses on one face overlap those on the other face so that the pair of holes bridged by the recess on one face lead to separate recesses on the opposite face, to provide a serial path for the flow of water through the holes.

Closure cap 106 includes a disc-shaped wall 130 surrounded by a peripheral wall 132 formed with an annular recess 134 on its outer face to define an inner annular shoulder 136 and an outer annular shoulder 138. The device is assembled by disposing the flow-retarding member 120 into housing 104 and then snap-fitting closure cap 106 thereover by pressing the cap until its inner annular shoulder 136 snaps behind to underlie the outer annular shoulder 116 of the housing.

Stem 118 extends centrally of the housing end wall 108 and is formed with an axial bore 140 extending through its tip 142. The latter includes an annular, tapered flange or shoulder 144 having a flat rear face 145.

Bore 140 constitutes an inlet opening conducting the water from the water supply pipe (not shown) into housing 104, the housing being formed with an outlet opening 150 extending through the annular recess 112 of its peripheral wall 110. The flow-retarding member 120 is formed with a central opening of larger diameter than in FIGS. 1 – 4b, this central opening including an inlet recess 128 leading to an inlet hole 122 through member 120. The water thus introduced into the central opening in the flow-retarding member passes serially through the holes, moving from one face to the other as described above with respect to FIGS. 1 – 4b, and finally exits through an outlet recess 128 at the outer periphery of member 120. When closure cap 106 is snapped into housing 104, end wall 130 of the cap presses against the outer face of the flow-retarding member 120 to hold same in position between it and housing end wall 108, with the outlet recess of the member being aligned with annular recess 112 formed in the peripheral wall 110 of the housing. The water thus reaches recess 112 and exits therefrom through housing outlet 150 in a slow trickle.

In the device of FIG. 5, a regulator is included within the flow-reducing device to regulate the outlet flow from the device under varying water-pressure conditions, which may arise because of pressure drops along the water supply line, fluctuations in the line pressure, or different elevations at which the devices are located.

The regulator of FIG. 5 comprises a rod 170 passing through bore 140 in stem 118 and into the housing 104. Rod 170 also passes through the central opening of the flow-retarding member 120 and then out through wall 130 of the housing closure cap 106, the latter wall being centrally dished and formed with an opening 172 for this purpose.

The inner end of rod 170 has a valve member 174 fixed thereto, which valve member cooperates with an internal annular shoulder 176 formed at the tip 142 of stem 118. The opposite end of rod 170 within housing 104 carries a disc-shaped member 178 which is disposed in the central recess of the flow-retarding member 120. An apertured resilient pad 180, of rubber for example, is interposed between disc 178 and the inner face of wall 130 of the closure cap 106.

Disc 178 carried by rod 170 has a substantially larger cross-sectional area than valve member 174. Disc 178 thus senses the fluid pressure at the inlet to housing 102, i.e. at the inlet hole of the flow-retarding member 120, and will cause rod 170 to be displaced, in response to the pressure sensed, to move its valve member 170 towards or away from the annular shoulder 176 in stem 118. The displacement of rod 170 is countered by the apertured resilient pad 180 which serves as a spring element for spring-biassing the rod towards the fully open position, i.e., wherein its valve member 174 is at the greatest distance from shoulder 176.

It will thus be seen that should there be an increase in the inlet pressure, this will be applied to disc 178, which will cause it, and its rod 170, to be displaced against resilient pad 180 in the direction bringing valve member 174 towards shoulder 176, thereby restricting the opening in stem 118 leading to the inlet hole of the flow-retarding member 120. Thus, the flow of water to the inlet of member 120, and therefore from outlet hole 150, will be regulated with varying line pressures.

Figure 6:
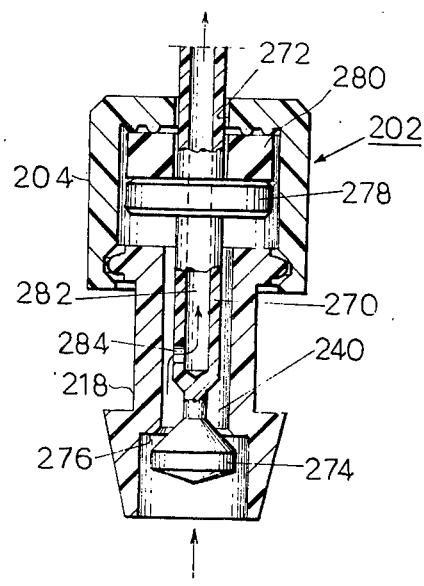
FIG. 6 is a sectional view of another application of the regulator of the present invention.

FIG. 6 illustrates another application for the same type of regulator. The regulator in FIG. 6, therein generally designated 202, is adapted to be connected to a sprinkler or other water distribution device for regulating the water supplied to that device in response to changing line pressures.

The device illustrated in FIG. 6 includes a housing 204 which, in this case, does not include a flow-retarding member as in FIG. 5, but rather includes only the regulator. The latter comprises a rod 270 extending through a central stem 218 depending from housing 204, and carrying at its opposite end a valve member 274 cooperable with an internal annular shoulder 276 formed in stem 218. The device of FIG. 6 also includes a pressure-sensing disc 278 fixed to rod 270 within the housing, and a resilient pad 280 for biassing valve member 274 to its fully open position.

In the embodiment of FIG. 6, rod 270 is formed with an axial bore 282 communicating with the stem bore 240 via a radial opening 284 formed between annular shoulder 276 and the pressure-sensing disc 278. Opening 284 and axial bore 282 serve as a conduit for conduiting the water to the water distribution device (not shown), such as a water sprinkler, which would be connected to the end of rod 270 projecting through opening 272 of housing 204.

The device of FIG. 6 operates substantially the same as in FIG. 5. Thus, any increase in the line pressure causes the pressure-sensing disc 278 to move against resilient pad 280, thereby bringing valve member 274 closer to annular shoulder 276, and restricting the flow of water inletted into bore 240 of stem 218. The water introduced into stem 218 flows, via radial opening 284 and axial bore 282, to the device (not shown) connected to the upper end of rod 270, and will therefore be regulated in accordance upon variations in the line pressure.

Many other variations, modifications and applications of the invention will be apparent.

What is claimed is:

1. A flow-reducing device particularly useful as a drip emitter for drip irrigation, comprising: a housing including a disc-shaped end wall and a peripheral annular wall formed with an annular recess on its inner face to define an inner annular shoulder adjacent to said end wall, and an outer annular shoulder, said housing further including an inlet opening formed centrally through said end wall, and an outlet opening formed through the annular recess of the peripheral wall; a disc-shaped closure cap formed with an annular recess on its outer face to define an inner annular shoulder and an outer annular shoulder; and a disc-shaped flow-retarding member disposed within the housing and having an inlet opening aligned with the central inlet opening of the housing, an outlet opening aligned with the annular recess in the housing peripheral wall, and a circuitous fluid flow pathway between its inlet and outlet openings for retarding the flow of the fluid therethrough; said closure cap being snap-fitted into the main housing section with the inner annular shoulder of the cap underlying the outer annular shoulder of the main housing section, and with the inner face of the cap applying a compressive force against the flow-retarding member to hold same in position with its outlet opening aligned with said annular recess in the housing peripheral wall, whereby said recess serves as an outlet path for the flow of the fluid to the housing outlet opening.

2. A device according to claim 1, wherein said housing includes a central stem for insertion into a fluid carrying pipe, said stem having an axial bore constituting said inlet opening.

3. A device according to claim 2, further including a regulator comprising a rod passing through the bore in the central stem and into the housing of the disc-shaped flow-retarding member; the bore of said stem being formed with an internal annular shoulder; a valve member carried at one end of said rod adjacent to said annular shoulder; and a spring-biassed pressure-sensing member, having a larger cross-sectional area than the valve member, carried at the opposite end of the rod and disposed within said housing such as to sense the fluid pressure at the inlet to the housing and to move, in response thereto, the rod and valve member with respect to the internal annular shoulder in said stem.

4. A device according to claim 3, wherein said rod passes through a central opening in the flow-retarding member and a central opening in the closure cap of the housing.

5. A device according to claim 4, wherein said spring-biassed pressure-sensing member is of disc-shape and includes a resilient spring element between it and the closure cap of the housing.

6. A device according to claim 5, wherein said spring element is an apertured resilient pad interposed between the disc-shaped pressure-sensing member and the closure cap of the housing and effective to seal the central opening in said closure cap.

7. A device according to claim 1, wherein said flow-retarding member is formed with a plurality of holes extending therethrough from one face to the opposite face thereof, said member being further formed with a plurality of recesses on both faces thereof, each recess bridging a pair of holes, the pair of holes bridged on one face by one recess leading to separate recesses on the opposite face, the flow-retarding member being pressed between the inner face of the housing end wall and the inner face of the cap, whereby the recesses provide flow-paths between holes at both faces of the flow-retarding member causing the fluid to flow through the holes in succession, passing back and forth from one to the opposite face of the member before exiting in a slow trickle from the housing outlet opening.

* * * * *